UNITED STATES PATENT OFFICE.

EDMUND HENRY BECKER, OF WASHINGTON, DISTRICT OF COLUMBIA, ASSIGNOR TO KINETIC ELECTRIC COMPANY, OF NORFOLK, VIRGINIA, A CORPORATION OF VIRGINIA.

PROTECTED ELECTRODE AND PROCESS OF MAKING THE SAME.

1,211,388.      Specification of Letters Patent.      Patented Jan. 9, 1917.

No Drawing.     Application filed October 18, 1916. Serial No. 126,317.

*To all whom it may concern:*

Be it known that I, EDMUND HENRY BECKER, a citizen of the United States, residing at Washington, in the District of Columbia, have invented certain new and useful Improvements in Protected Electrodes and Processes of Making the Same, of which the following is a specification.

The invention relates to protected electrodes and processes of making the same; and it comprises a negative electrode for primary cells and the like composed of copper oxid, or copper oxids, and having a superficial coating or layer of amalgamated copper, such copper oxids being advantageously an intimate and uniform mixture of cuprous and cupric oxids; and it comprises a method of making such electrodes wherein a copper oxid electrode is provided with a surface coating of copper by reduction in any suitable way and is then contacted with mercury in the presence of caustic soda and a little zinc; all as more fully hereinafter set forth and as claimed.

In the manufacture of primary batteries and also of secondary elements, an advantageous type of electrode is made of copper oxid. Frequently the copper oxid in granular form is compressed into shape with the addition of a binder, such as water-glass, molasses, etc., and is then baked. This copper oxid may be the ordinary black copper oxid. A better type of electrode for many purposes is made by taking an intimate and uniform mixture, or chemical combination, of cuprous and cupric oxids and forming into electrodes; which may be done by directly fusing the mixture and casting into shape or in other ways. The complete electrode ordinarily is provided with a central copper wire or copper hanger to act as a conductor. The shape of the electrode is of course determined by the type and shape of cell with which it is to be used. In the use of these electrodes they are ordinarily made the negative electrode in a cell having a caustic soda or caustic potash electrolyte and a zinc positive electrode. As the development of current goes on, the copper oxids act as a depolarizer and are reduced to metallic copper. In so doing, the conductivity of the electrode goes up materially; or what is the same thing, its resistance diminishes. The copper oxid particles in and of themselves are not highly conductive and in the usual electrode made up of granules of oxid compressed together, the resistance is further heightened by the more or less imperfect contact made by the granules with each other and with the hanger or central copper conductor. This is particularly the case where any foreign substance is used as a binder, since the binder interposes between meeting faces of the granules to a greater or less extent. Electrodes made of fused copper oxid have a better conductivity and to that extent are better for their intended purposes, since their resistance is less and their action is more uniform. The resistance of the electrode decreases somewhat after short use since superficial reduction produces metallic copper which forms a linking conductor between the surface particles. In preparing these electrodes for use it is a good expedient to reduce the copper oxid superficially to some extent forming a surface film or layer of metallic copper, prior to putting the electrode into use or assembling it with the other parts of the cell. This directly gives the lessening in resistance or heightening in conductivity which the untreated electrode would assume after some time of use. In other words, the cell with the coppered electrode starts off in use with the same efficiency that an untreated electrode assumes after a period of time. It is however found that if there is much delay in putting these coppered electrodes into use they tend to "go back;" that is, if the coppered electrode has been standing for a time it does not give as good results in the cell as a freshly prepared electrode; and in the cell, if the cell be not put into use immediately but be allowed to stand on the shelf for a time, there is also this tendency to go back. The reason for it is not known but it may be that after the production of the copper coating oxidation takes place on standing and renders the contact of the copper with the copper oxid less perfect. In a good copper-surfaced copper oxid electrode the copper on the surface should be in metallic contact with the surfaces of all of the exterior granules and give metallic conduction therebetween and the hanger or wire serving as a conductor for the electrode. Probably the excessively thin coating of copper, which is not a continuous body of metal, tarnishes by reason of electrolytic action with production of tarnish films at points where metallic contact should be. This going back of the copper coated electrodes is a source of annoyance and loss; and particularly where the cells are kept in storage as they ordinarily must be for a time prior to putting into use. The cell is, to a limited but annoying extent, unreliable.

I have found that this going back of copper-surfaced copper oxid electrodes may be prevented by the simple expedient of amalgamating the copper surface. And there are certain other electrical advantages gained, causing the cell to be more constant and even in its output of current. Cells having electrodes so treated may be kept on the shelf for months and give as good results as cells having electrodes freshly copper-surfaced prior to use; in fact the results are better.

Amalgamation by direct contact with mercury of the copper surface of the pole which is always excessively thin, is not easily practicable unless both be "chemically clean"; something which is difficult to attain. But I have found that no difficulty arises in the amalgamation if the contact of the copper surface and the mercury be made in the presence of caustic soda solution and a little zinc. Under these circumstances, the copper readily takes up mercury.

In a practical embodiment of my invention I take a copper oxid electrode which may be any of those hereinbefore described but is most advantageously one made by the uniform and intimate mixture of the two oxids of copper (Tassin Patent No. 1,129,818) and act on it with zinc in a caustic soda electrolyte; which may be done by merely short-circuiting the oxid pole and a zinc pole in caustic soda. Or the copper oxid electrode may be simply dipped into a mixture of caustic soda solution and zinc powder. After a short period of action, the surface particles of the electrode will be converted into copper in the usual manner; this copper forming a contacting extension from the copper hanger or wire of the electrode to all the surface particles of copper oxid and therethrough to the residue of the copper oxid. The electrode is now in excellent condition for immediate use; but, as stated, on standing it is apt to go back. Therefore I next dip the copper plated element into caustic soda solution and contact with a little mercury, first adding a little zinc dust to the mercury. Under these circumstances amalgamation begins at once and the red surface of the electrode whitens. After this treatment it may be exposed to the action of a caustic soda solution to remove any zinc left in the amalgam, taken out, washed and dried. It is then ready for assemblage in a complete cell.

The complete cell may be stored for many months prior to use without lessening its efficiency. In parallel comparison of cells with the new type of electrodes as against cells having exactly the same electrodes but not amalgamated, it was found that in putting the cells into action after about two months storage the cell with the copper surface but an unamalgamated electrode had less than 30 per cent. of its efficiency while the cell otherwise the same but having the electrode amalgamated developed the rated amount of current, starting off at once with the correct amount of current. In the discharge of the cells the superficial mercury disappears after a time, probably by extending from the surface to the copper developed interiorly of the electrode by the electrolytic action of the cell.

What I claim is:—

1. As a new article of manufacture a negative electrode for galvanic cells composed of copper oxid with a superficial coating of amalgamated metallic copper.

2. As a new article of manufacture a negative electrode for galvanic cells composed of an intimate and uniform mixture of cuprous and cupric oxids having its surface covered with a thin coating of amalgamated copper.

3. In the production of protected copper oxid electrodes the process which comprises superficially coating a copper oxid electrode with copper and thereafter amalgamating such coating with mercury.

In testimony whereof, I affix my signature hereto.

EDMUND HENRY BECKER.